(12) United States Patent
Micklethwaite (10) Patent No.: US 6,321,900 B1
(45) Date of Patent: Nov. 27, 2001

(54) POWER TAKE OFF FROM AN ENDLESS CONVEYOR (75) Inventor: Barry Micklethwaite, Stapleford (GB)

(73) Assignee: Scorpio Conveyor Products (Proprietary) Limited, Witbank (ZA)

( * ) Notice: Subject to any disclaimer, the term of this patent is extended or adjusted under 35 U.S.C. 154(b) by 0 days.

(21) Appl. No.: 09/147,086

(22) PCT Filed: Mar. 26, 1997

(86) PCT No.: PCT/GB97/00854

§ 371 Date: Oct. 2, 1998

§ 102(e) Date: Oct. 2, 1998

(87) PCT Pub. No.: WO97/36807

PCT Pub. Date: Oct. 9, 1997

(30) Foreign Application Priority Data

Apr. 2, 1996 (GB) .................................... 9606999

(51) Int. Cl.[7] .................................... B65G 45/18
(52) U.S. Cl. ............................ 198/498; 198/496
(58) Field of Search .................... 198/498, 496

(56) References Cited

U.S. PATENT DOCUMENTS

| 2,595,392 | * | 5/1952 | Lalancette | 198/496 |
| 2,885,069 | * | 5/1959 | Bowen | 198/496 |
| 3,944,050 | * | 3/1976 | Kane | 198/498 |
| 3,957,155 | * | 5/1976 | Enchelmaier | 198/496 |
| 4,041,785 | | 8/1977 | Roark . | |
| 4,073,376 | * | 2/1978 | Krooss | 198/496 |
| 4,182,444 | * | 1/1980 | Fisher | 198/496 |
| 4,218,881 | | 8/1980 | Huffman et al. . | |
| 4,321,018 | | 3/1982 | Hurt . | |
| 5,161,666 | * | 11/1992 | Pope | 198/498 |
| 5,497,872 | * | 3/1996 | Pennino | 198/498 |
| 5,779,024 | * | 7/1998 | Harper | 198/496 |

FOREIGN PATENT DOCUMENTS

| 510039 | 6/1980 | (AU) . |
| WO 94/29203 | 12/1994 | (WO) . |

* cited by examiner

Primary Examiner—Douglas Hess
(74) Attorney, Agent, or Firm—Jones, Tullar & Cooper, P.C.

(57) ABSTRACT

A hydraulic power take off device for an endless conveyor belt system having an upper material run and a lower return run, said device being arranged to generate hydraulic fluid at pressure to maintain a self adjusting force to belt cleaning equipment, and other equipment that can utilize fluid pressure. The take off device is driven directly or indirectly from the motion of the conveyor belt or from the motion of other components fitted to the endless system. The power take off comprises a hydraulic pump which is rotated by the motion of the endless conveyor and generates fluid at pressure via an adjustable relief valve and maintains a constant self adjusting force of actuators, automatically compensating for wear that takes place on the equipment being operated and providing an automatic and interlocked source of power, generating pressure only when the conveyor belt system operates.

10 Claims, 11 Drawing Sheets

POWER TAKE OFF FROM AN ENDLESS CONVEYOR

FIELD OF THE INVENTION

This invention relates to the deriving of hydraulic power from the linear or rotary motion of an endless conveyor belt or the linear or rotary motion of other components or devices fitted to an endless conveyor belt, said conveyor being of the type having an upper conveyor run and a lower return run.

BACKGROUND AND GENERAL DESCRIPTION OF THE INVENTION

According to one aspect of the invention, there is provided a power take off device for an endless conveyor belt system of the type comprising an endless belt having an upper conveyor run for transporting material and a lower return run, the power take off device comprising an hydraulic pump operably linked to the belt or to a rotating component forming part of the conveyor belt system so as to generate hydraulic fluid at pressure only when the conveyor belt is in motion.

In another aspect, the invention provides a conveyor belt system incorporating a power take off device as defined above.

For convenience hereinafter an endless conveyor system will be referred to as a conveyor belt, or a conveyor belt system.

An existing roller or drum in the conveyor belt system can be utilised to provide rotary motion to drive an hydraulic pump, or a roller can be introduced into the conveyor belt system to achieve the required drive to the pump. The existing roller or the drive obtained from other components, or the introduced roller, becomes an automatically interlocked prime mover to rotate an hydraulic pump. Fluid pressure from the pump may then be used to power hydraulic actuators. Electrical motors, switchgear and interlocking supply would not be required.

Specifically the pump may be used to transmit a volume of fluid at pressure to a number of devices used on conveyor belts. These include belt scrapers, drum scrapers, top and bottom belt ploughs, rotary brush cleaners and fines conveyors.

In all these devices, as they are used, wear takes place and regular adjustments is required. Belt cleaning devices they need to be maintained in contact with the belt surface to ensure that efficient cleaning is taking place. By providing hydraulic fluid at pressure to actuators the cleaners can be maintained at constant pressure against the belt surface thereby providing a self adjusting mechanism at a pre-determined constant force which will require no adjustment throughout the cleaning elements' life.

The power take off of the invention is of particular utility for the automatic tensioning of belt cleaning devices, especially belt scrapers.

The hydraulic pump may have an internal or external relief valve, internal or external flow control, and an internal or external reservoir, or may be a pump that is contained within a roller, the inside of the roller being used as the reservoir. A support or bracket may fix the hydraulic pump to the conveyor framework and contain any torque reaction.

A driving roller may be introduced into the conveyor system to frictionally engage with any surface or edge of the belt fabric, or drums, to produce rotary motion or linear motion with which to rotate or otherwise drive the pump. Alternatively a stub shaft or drive train may be used to derive the necessary motion to the pump from existing roller, drums, or other rotary components within the endless belt system, or from any other components or equipment retrofitted to operate on the conveyor belt system. In another embodiment a roller may be introduced into the system which when the belt is not loaded with material is disengaged and frictional engagement takes place when the weight of the material being transported depresses the belt to rotate the pump roller.

The pump may be connected to the rotary motion or linear motion of the endless belt system by any suitable means, eg freewheel clutch, flexible drive cable, magnetic coupling or drive train. Rotary or linear actuators which are supplied with fluid pressure via hoses or pipes may be single or double acting.

The generating pump can take any suitable form, eg piston, gear, vane, centrifugal or diaphragm to generate the required hydraulic flow and pressure. Alternatively an existing pump may be used to provide the pressure such as a lubrication pump inside a gearbox. The pressure may be obtained by utilising the pressure generated by a scoop type traction coupling, to maintain constant pressure via a pressure reducing valve to belt cleaning equipment or any equipment that needs to be continually adjusted. The hydraulic fluid can be of any type or viscosity, eg mineral or vegetable oil, synthetic oil, soluble oil, water, detergent, cleaning fluid or disinfectant.

The device is fixed to any suitable of the conveyor by any suitable means and may be portable and attached to any suitable structure anywhere along its run to provide hydraulic pressure to operate pumps and hand tools, or to spray fluid onto the belt to clean or sterilise the belt.

The pump may be used to detect slowing down of the belt ie belt slip or overloading, whereby a pressure drop causes the power to be removed from the conveyor drive by the used of a pressure switch. The pressure generated may be used to maintain constant pressure to a belt scraper/cleaner and also to operate a vibrator attached to the scraper/cleaner to induce vibration forces into a localised area of the belt surface.

The power take off device may generate hydraulic fluid at pressure to more than one item of equipment by the use of unloading valves, direction valve, pressure reducing valves and the like. The power take off device may convert the rotary motion of the conveyor belt or other components within the conveyor system, or retrofitted to the conveyor system, into linear motion to drive an hydraulic pump that operates by linear motion.

The hydraulic fluid generated may power an automatic lubrication system to grease or oil at desired intervals, bearings and other moving components within and around the conveyor belt system.

The pump may be a tandem or triple pump within the same housing and driven from one source, producing fluid at pressure at different settings to operate more than one circuit.

The power take off device may provide hydraulic pressure to any number of belt cleaning devices.

The hydraulic pressure to the actuators may be removed when a joint in the belt is approaching allowing the cleaning device to relax from the belt and the joint to pass over the cleaner unhindered. Pressure would then be reapplied after the joint or obstruction has passed.

A pump may be fitted at each end of the conveyor and between drive input and pump a freewheel clutch may be fitted to ensure that pressure is only generated in one direction.

Fines conveyors are fitted underneath the drivehead of an endless conveyor to transfer spillage and debris removed from the belt surface by the aforementioned belt cleaners. These are usually of the type that has an endless chain with flight bars running in a race within the conveyor pan to convey material into the main chute along with the main flow of material. These chains stretch and wear takes place between the links. This slack chain needs to be continually adjusted to avoid the links standing on end and jamming in the return race. By fitting linear actuators at one end of the chain conveyor, with pressure being provided from a pump attached to the conveyor belt system, the slack chain could be continually adjusted at a predetermined force therefore negating any manual adjustment until the chain is worn or stretched beyond practical use.

The aforementioned uses only require the hydraulic power when the conveyor belt is in motion, once the conveyor belt has stopped the pressure in the hydraulic circuit reduces, relaxing the device it is operating. In most cases this would not be detrimental and probably advantageous as components in the system would not be under load when the conveyor belt is stationary. This relaxing of the component being operated would dislodge any material built up around the operating mechanism and not allow cylinders to stick in a position. Should it be required to maintain pressure in the circuit when the belt is stationary, a simple non-return valve would provide this feature.

The pressure and volume of fluid required to operate these devices would be very low by hydraulic standards. Small pumps operating at slow rpm would provide sufficient fluid at pressure without the need of a large reservoir. The amount of wear taking place on the cleaning elements can be measured in thousands of a millimeter per hour, therefore very little volume of oil is required, and is largely a case of maintaining a constant pressure to the actuators. Because of the low pressure and volume requirement, very little heat would be generated and power absorbed by the pump would also be small. Large diameter drums in the conveyor belt system would be ideal to use as the prime mover for the pump due to their low revolutions. The pump would be rotating slowly (in the order of 50 to 100 rpm) which would prolong the life of the pump and generate less heat, ensuring reliability.

The aforementioned used for this power take off can readily be adapted to existing cleaning systems which are generally manually adjusted. Belt cleaning devices need to be continually adjusted to maintain the required cleaning pressure. Every person will have a different setting that they think is correct but often is not. The use of this proposed system would allow the use of a given pressure to set the cleaner for a particular situation and once set would not require further adjustment until the cleaner element is worn out, reducing adjustment/maintenance requirement and operator error.

On reversing conveyors material is transported in both directions. A belt cleaner is fitted at each end of the conveyor belt system but each cleaner is only required to be in operation 50% of the time, but both are always in contact with the belt surface. The cleaner at the return end of the conveyor wears itself more than is necessary. By utilising a freewheel or one way clutch between the drive and the pump at each end of the conveyor, pressure will only be generated in one direction. When in motion the pump at the delivery end pressurises the scraper, whilst the scraper at the return end is relaxed as pressure is not being generated. Whichever direction the belt is running, the return end scraper is relaxed from the surface, prolonging the life of the belt surface and the life of the scraper element.

Generally, cleaning devices for conveyor belts are manually adjusted or adjusted by counterweights, rubber torsion units or springs. These adjusting methods do not provide constant cleaning pressure nor do they provide total self adjustment throughout the cleaner's life. For any belt cleaner to be successful its most important feature will be its ability to self adjust to compensate for element or blade wear whilst maintaining a constant pre-determined force against the belt.

Compressed air actuators charged from a ring main can be used to provide this self adjusting feature, but compressed air is not always available or financially viable. In remote locations away from a plant's main activity it would be costly to pipe air over long distances. It is this type of location where a self contained power source would be useful.

Remote locations tend to be neglected and adjustment of belt cleaning equipment likely to be infrequent. Once a cleaning device is out of adjustment or cleaning pressure drop off occurs, carry back of material is experienced, with debris then falling off along the length of the return run. Inevitably this has to be cleaned up before costly damage occurs to return rollers and belt which increases operating costs for the user.

Further uses of the proposed invention could be accommodated by the use of a pump producing a greater quantity and pressure of hydraulic fluid. This increase of power could be used to provide an automatically interlocked power source to hydraulically drive rotary cleaning brushes, diverting ploughs, diverting plates within the head chute, band plates, belt steering systems and many other devices fitted to conveyor belt systems. To assist the flow of materials down a chute increases in fluid power could be used to power an hydraulic vibrator attached to the chute to induce vibrational forces. The device would be automatically interlocked with the movement of the conveyor. Little maintenance would be required as lubrication will be provided by the flow of oil and would also dissipate any heat generated.

Control of the volume of fluid transmitted may be provided by any suitable method, such as variable output pump, control valve or restrictor. Speed control would be advantageous for a rotary cleaner as its wear rate depends in part on its rotational speed. This readily available control of the brush speed would mean that the cleaner could be easily optimised to suit the conditions that exist on the belt to which it is applied. Hydraulic pressure could also be used to maintain the brush or rotary scraper in contact with the belt surface at a constant cleaning pressure.

A known type of rotary brush cleaner is driven directly from the motion of a roller engaging the upper surface of the return belt. This type of device uses a counterweight acting around the drive/pivot centre to urge the rotary brush into contact with the belt surface and to provide self adjustment. By attaching a pump to the drive roller or brush shaft, hydraulic pressure could be generated to actuators which would provide self adjustment and a constant predetermined pressure. The length or size of such a device could be reduced by as much as 50% to make installation easier.

The aforementioned methods of adjusting belt scrapers/cleaners such as manual adjustment by screw or bolt, springs, counterweights, rubber torsion springs and air springs/air cylinders all maintain the cleaning pressure even when the conveyor is stationary. This puts unnecessary strain on the components of the belt cleaner at shut down periods. It allows springs to settle in a position and air cylinders to stick due to lack of movement.

The use of an hydraulic pump driven by the motion of the belt allows the belt scraper/cleaner to relax from the belt when the conveyor is stationary. When the pressure drops to the actuators the weight of the cleaner forces the oil back through the pump to the reservoir. This tends to dislodge any material that has built up around the cleaner and any dust around the mechanism.

If a conveyor runs empty for any period of time the scraper/cleaner is still maintained at pressure against the belt surface. This causes unnecessary wear to both belt cover and cleaner element. The proposed method of using the motion of the conveyor belt system to drive a pump would allow the installation of a pump under the troughed section of the conveyor belt. When the belt is in motion without its load of material, the pump would be arranged so that frictional engagement with the pump drive roller does not take place and pressure is therefore not generated, allowing the cleaner to relax from the belt surface. When the conveyor has material being transported, the weight of this material moves the belt into contact with the pump roller and pressurises the cleaner against the belt. This method will increases the life of the belt and the cleaner element.

A further method of relaxing the scraper/cleaner when the conveyor system is running without its load of material, could be a achieved by the use of a diverter valve. A pump could be attached to an existing roller in the conveyor system and produce pressure when the belt is running. The pressure is piped to a diverter valve which is normally closed, allowing the pump to relieve oil pressure back to the reservoir. In this valve position, fluid is allowed to return from the large area of the cylinder through the valve and back to the reservoir, which relaxes the scraper/cleaner. The valve is suspended above the belt and a vertical lever arm is swung by the carried material which opens the valve. This second position of the valve diverts fluids to the large area of the cylinder and actuates the scraper/cleaner against the belt. When the conveyor is not in motion the weight of the cleaner forces fluid through the valve, to exit back to the reservoir. If the conveyor was to stop while still loaded with material the valve would be in its second position, the weight of the cleaner would force oil back to the reservoir by exiting the valve via pressure port, forcing oil through the pump and back to the reservoir.

Mechanical joints in an endless conveyor are a particular problem in that the scraper/cleaner is impacted at high speed as the raised joint passes through the scraper/cleaner. The joint can be damaged by this impact creating costly repairs and downtime. The scraper/cleaner wearing edge can also be damaged by these repetitive blows, tearing lumps out of the blade edge. This allows small particles of material to pass through the scraper/cleaner.

The proposed method of hydraulically adjusting the scraper/cleaner does provide a shock absorbing feature. When the blade is hit by the belt joint the fluid in the cylinder cushions the blow and forces oil back through the pump to the reservoir by overcoming the pressure in the circuit. When the joint has passed through the scraper/cleaner the actuators instantly reapply the said scraper/cleaner.

The proposed hydraulic adjusting system can be arranged so that the scraper/cleaner can be pressurised or relaxed away from the belt surface when a joint approaches and reapplied after the joint has passed over the scraper/cleaner unhindered.

Double acting cylinders can be used in conjunction with a two position, four port directional valve. When the valve is in its normal position of operation, flow from the pump enters the valve and exits to the large area of the actuators, lifting the scraper/cleaner into contact with the belt surface at a constant force. Fluid in the small area of the actuator (piston rod end) is forced back through the valve and exits by a separate line to the reservoir. When the spool of the valve is operated, the flow of oil inside the valve is reversed. Pressure is then applied to the small area of the actuator forcing oil out of the large area which exits the valve by the said separate line to the reservoir.

When the conveyor system stops pressure is not generated and the weight of the scraper/cleaner forces oil through the pump and back to the reservoir. This method pressurises the scraper from the belt surface as the joint approaches and reapplies pressure when the joint has passed through unhindered.

The two position valve would be of a type that has a spring return to its normal operating position. When the spool of the valve is depressed to reverse the flow it is maintained in this reverse flow position for an adjustable period of time. The valve is then allowed to return slowly to its normal operating position. This ability to adjust the rate of return of the valve would allow the joint to pass over the scraper/cleaner unhindered and to reapply pressure to the scraper/cleaner once the joint has passed.

The adjustable rate of return of the valve to its normal position would allow the same valve to be fitted to any speed of belt and its fitting in any convenient location. The spool of the valve could be operated electrically by a solenoid but is preferably operated by the raised joint which is generally proud of the belt surface.

A roller/lever could be positioned close to the belt surface and actuated as the joint passes over or under the said roller/lever. The lever would operate the spool of the valve and be locked in that reverse flow position for an adjustable period of time.

When the set time has lapsed, the valve returns to its normal position and fluid then applied to the large area of the actuator, reapplying the scraper/cleaner at a constant force against the belt. The same pressure can be applied to both ends of the double acting cylinders due to the weight of the scraper/cleaner assisting the pressure applied to the piston rod end and also because the large area of the piston is open to return.

If a vulcanised joint or a damaged section of belt is required to pass unhindered over a scraper/cleaner a small projection could be clipped or fastened to the belt surface to actuate the spool of the said valve.

A simpler method could be used whereby a similar valve with a mechanical time delay is used, but instead of applying pressure to the piston rod end of the cylinder, the valve when operated closes off the pressure from the pump and allows said pump to relieve. This allows fluid in the large area of the cylinder to pass through the valve and back to the reservoir, the weight of the scraper/cleaner forcing the oil back to the reservoir without the need of pressure being applied to the piston rod end of the cylinders. Double acting cylinders could be used with the piston rod end open to atmosphere. When the required time has lapsed, the valve spool returns to its normal position and reapplied pressure to the large area of the cylinders and closes the return line.

This method of pressurising or relaxing the scraper/cleaner from the belt surface when a joint or other obstruction is approaching the scraper/cleaner, could also be used in a compressed air operated system with equal effect.

Belt speed switches are fitted to conveyors to remove power from the conveyor in case of belt slip. The proposed hydraulic system could also act as a speed indicator by the use of a pressure switch. If the speed of the belt decreases the hydraulic pump produces less volume of fluid and the pressure in the circuit would decrease. The pressure switch in the circuit would detect this pressure drop and if connected to the emergency stop circuit would remove power to the conveyor.

The pressure switch would serve a dual purpose as it would eliminate the need of a belt speed switch and protect the hydraulic system in the case of a leak. Should a leak develop in the system and the reservoir run dry, the pressure in the circuit would drop and the pressure switch cause the removal of power to the conveyor system.

Scoop type traction couplings are used to transmit power between the motor and the conveyor driving drum. Hydraulic pressure is created within these couplings and would provide a convenient source of hydraulic pressure to tension various devices such as belt scrapers. A tapping could be taken from the coupling and if necessary the pressure reduced by a valve. Again hydraulic pressure would only be created when the conveyor is in motion and would therefore provide an automatically interlocked source of energy to adjust belt cleaning devices.

The hydraulic power take off from an endless conveyor system or from components or other devices fitted to the conveyor provides a self contained and automatically interlocked power source which can be utilised to self adjust wearing components in the conveyor system whilst maintaining a constant force. The device when applied to scraper/cleaner can reduce wear on the belt surface and the scraper/cleaner blade and work automatically with the belt movement.

The invention also seeks to provide a variable amount of power from the linear or rotary motion of the conveyor belt or other devices within the conveyor system.

By using the rotary motion of an existing roller or by introducing a roller to engage frictionally with any of the belt surfaces or edges, or by utilising the motion of a rotary brush or a motor used for other purposes or any other rotary equipment used or retrofitted to a conveyor, hydraulic pressure can be generated in remote locations where electricity or compressed air is unavailable or financially unviable. Its use would reduce maintenance requirements and capital expenditure. Mounted to the said rotating roller or rotary component by any suitable means, an hydraulic pump will in turn be rotated at a similar speed. The resulting fluid at pressure would be transmitted by hoses or pipes to actuators, thereby providing power to drive or tension any device that can be operated by fluid movement at pressure.

In its simplest form a low volume, low pressure pump with an integral reservoir is turned at low speed by a roller engaging any surface or edge of the conveyor belt. Fluid would be pumped to the actuators via an adjustable relief valve.

As in the case of belt cleaning devices very little movement of the actuators will take place, fluid would be circulated at the desired pressure through the relief valve and back to the reservoir whilst maintaining pressure to the cleaner.

When wears takes place on the cleaning device, pressure in the circuit will automatically keep tension on the cleaning device, ensuring self adjustment throughout its life at a constant pre-determined cleaning pressure.

Control of the fluid output may be achieved by increasing or decreasing the diameter of the roller frictionally engaged with the belt or by the use of gears or pulleys and belts that link the roller to the pump.

Regardless of the means adopted to obtain drive to the pump, no separate or dedicated power source is required. The necessary power input is therefore derived (directly or indirectly) from any convenient source of energy already available within the endless conveyor belt system.

The invention will now be described in greater detail, by way of illustration only, with reference to accompanying drawings and sketches in which,

DETAILED DESCRIPTION OF THE VARIOUS EMBODIMENTS

In the description of embodiments shown in several of the Figures, the same reference numerals are used to denote similar components even when installed in different locations.

Figure 1:
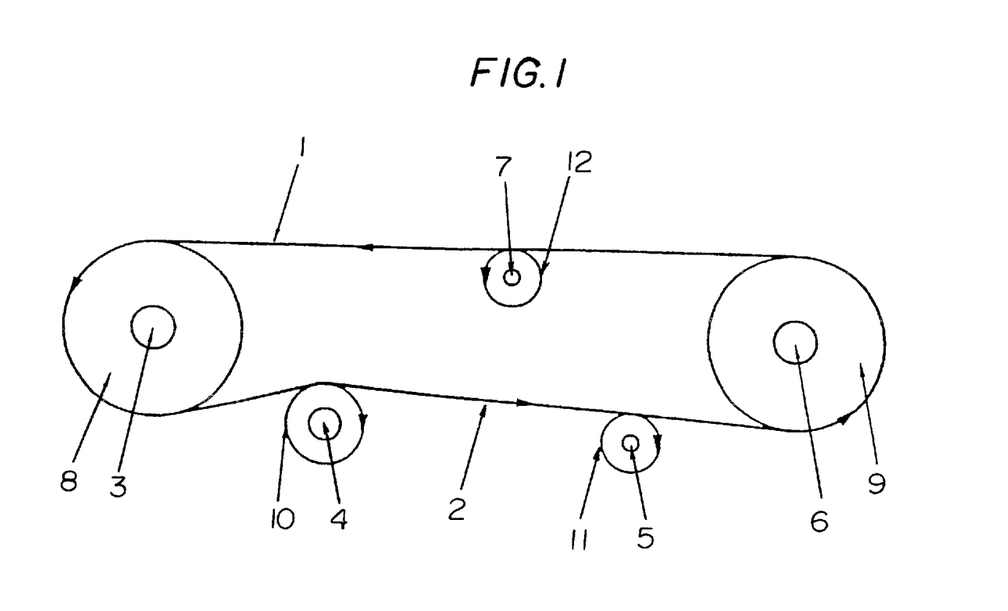
FIG. 1 is a sketch of a conveyor installation showing the position of exiting rollers which may be used to drive an hydraulic pump.

Referring first to FIG. 1, and endless conveyor comprises a belt system having an upper material run 1 and a lower return run 2. Roller shafts 3,4,5,6, and 7 may be utilised to drive an hydraulic pump. Connection between the roller shafts and the pump may be by any suitable means eg muff coupling, bolted coupling, flexible drive cable, two gears meshing together or a gear on the roller shaft driving a gear on the pump shaft via a toothed belt. A freewheel clutch may also be used to connect a roller shaft to the pump so that on reversing conveyors no drive takes place when running in reverse direction. The direction of rotation of head drum 8, return drum 9 and belt idler rollers 11 and 12 are shown in the sketch.

Figure 2:
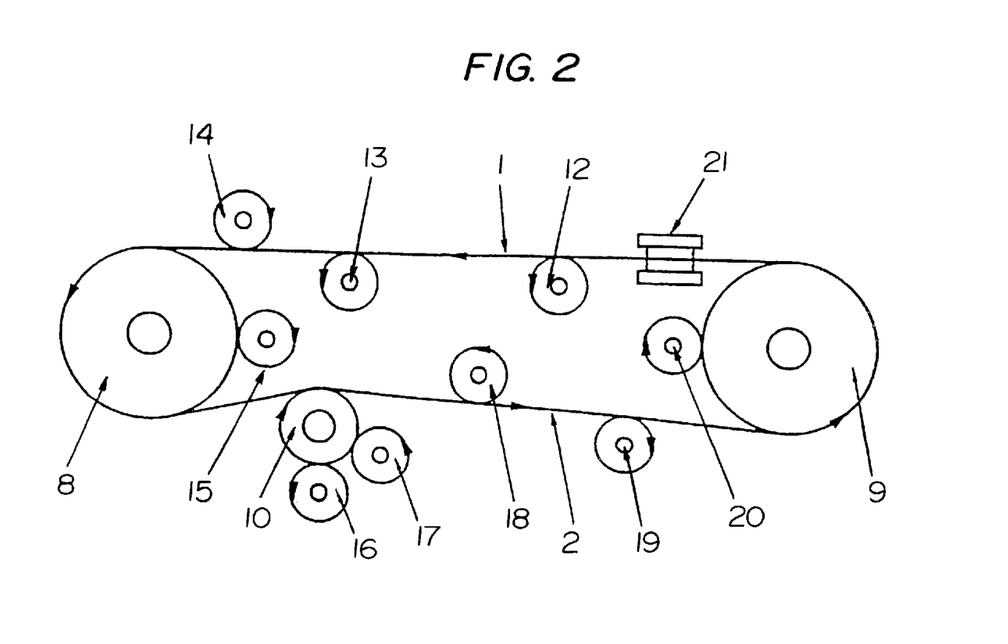
FIG. 2 is a similar sketch of FIG. 1 showing the positions at which a roller may be introduced into frictional engagement with the belt.

Referring now to FIG. 2, and endless conveyor with an upper conveyor run 1 and a lower return run 2 shows the belt passing over head drum 8, over snub drum 10 and finally around return drum 9. Items 12,13,14,15,16,17,18,19,20 and 21 show positions of rollers that may be introduced and adjusted into contact with the belt surface or into contact with existing rollers in the conveyor system to obtain drive to a pump.

Figure 3:
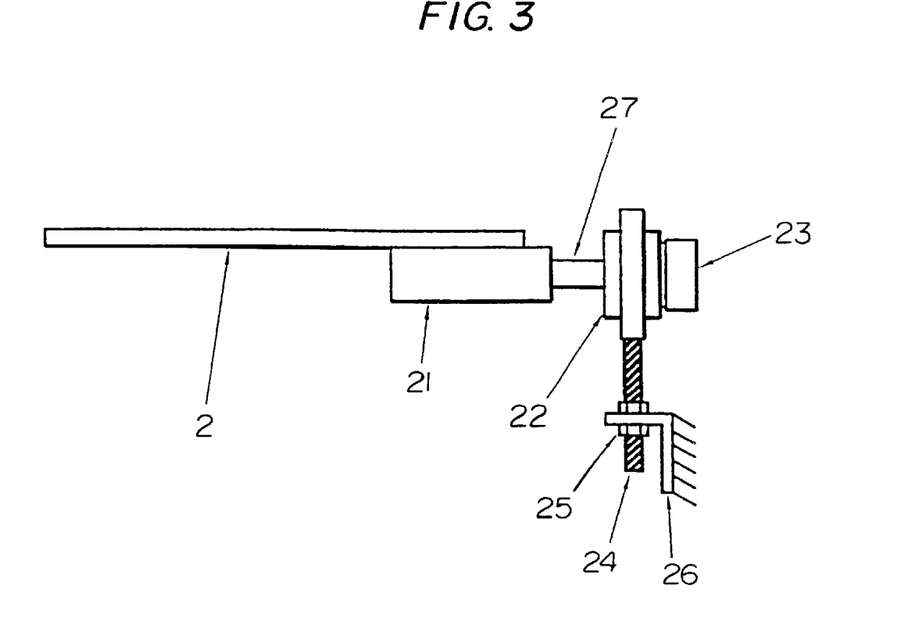
FIG. 3 is a view of a means of adjusting a roller into frictional engagement with the conveyor belt surface.

Referring now to FIG. 3, this shows the lower return run 2 with a roller 21 adjusted into contact with the belt surface. Bearing 22 supports the roller 21 and pump 23. Adjustment bolt 24 and nuts 25 adjust the roller into frictional engagement with the belt. Support bracket 26 is fixed to a suitable mounting on the conveyor structure. Shaft 27 transmits drive to pump 23.

Figure 4:
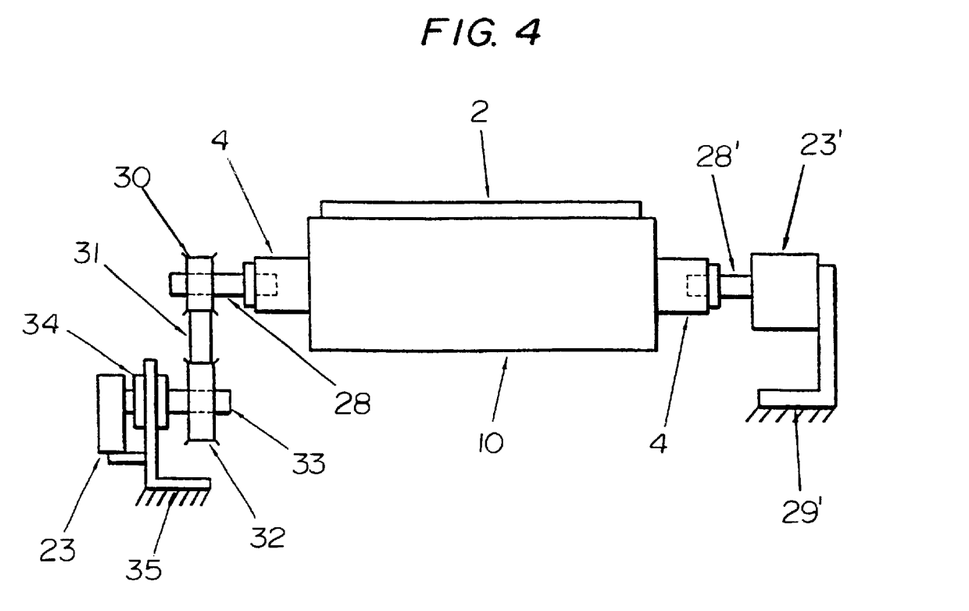
FIG. 4 is a sketch showing two different methods of deriving drive from an existing roller in the conveyor system.

Referring now to FIG. 4, this shows the return run 2 of the conveyor belt passing over snub roller 10. Two different methods of deriving drive from the roller 10 are illustrated. In the arrangement shown on the left hand side of the drawing, roller shaft 4 is utilised to drive pump 23. A stub shaft 28 is attached to shaft 4 to drive a toothed belt pulley 30, toothed belt 31 and drive pulley 32. This drive pulley 32 is attached to idler shaft 33. Shaft 33 drives pump 23, the whole being supported by bearing 34 and bracket 35.

The arrangement shown at the right hand side of the drawing is simpler. Stub shaft 28' is attached to roller shaft 4. Fastened to stub shaft 28' is an hydraulic pump 23'. The pump 23' is supported by a bracket 29' and fixed to a suitable mounting on the conveyor framework.

Figure 5:
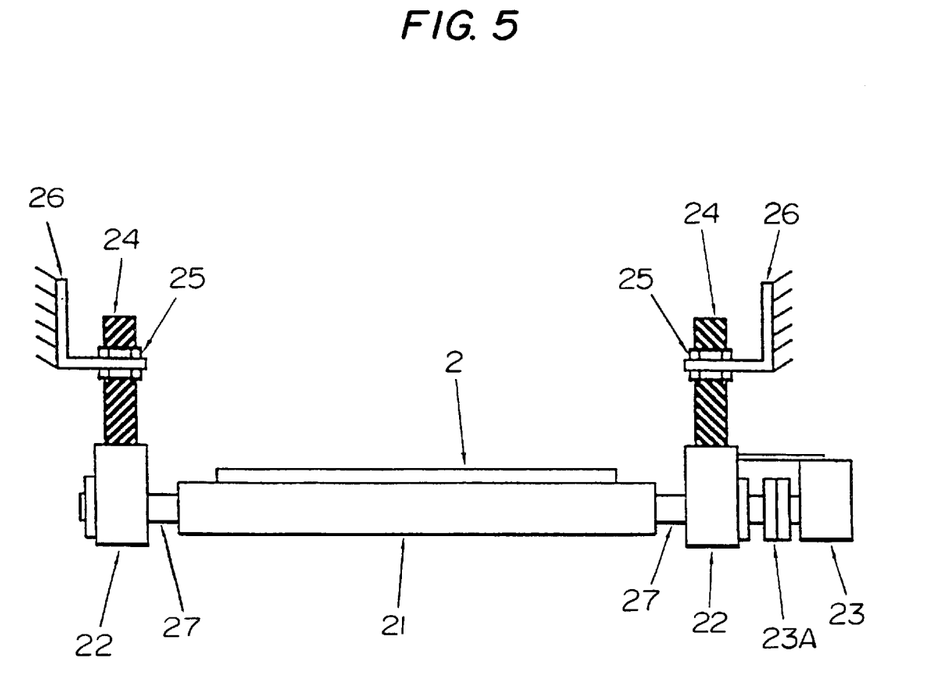
FIG. 5 depicts a method of introducing a roller into frictional engagement with the conveyor belt surface.

FIG. 5 shows a return conveyor belt 2 with a roller 21 adjusted to frictionally to engage with it. Bearings 22 support the roller shaft 27. Coupling 23A attaches pump 23 to shaft 27. Adjusting bolts 24 and nuts 25 adjust the roller into contact with the belt. Brackets 26 are mounted to a suitable fixing on the conveyor structure.

Figure 6:
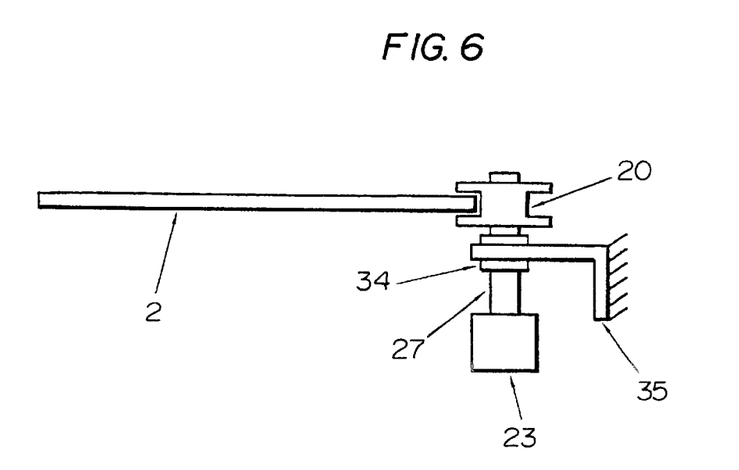
FIG. 6 shows a further method of obtaining drive to a pump by engaging a roller with the edge of the belt.

FIG. 6 shows a pulley frictionally engaged with the side of return run 2. Pulley 20 is brought into contact with the belt to obtain drive to a pump 23. Attached to pulley 20 is a shaft 27 which is supported by bearings 34 and bracket 35 which is fastened to a suitable fixing on the conveyor structure.

Figure 7:
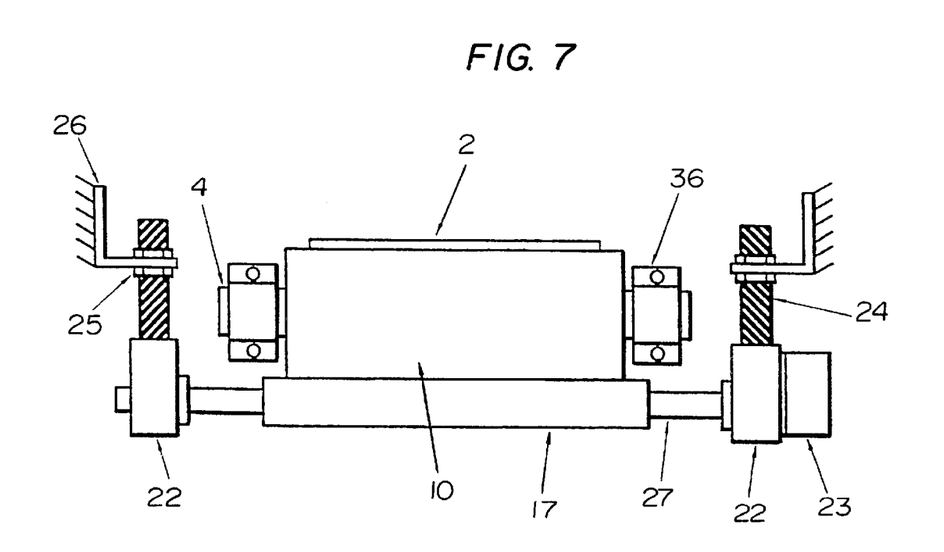
FIG. 7 is an illustration of a further means of obtaining drive to a pump by introducing a roller to engage frictionally with an existing roller in the conveyor system.

FIG. 7 shows a further means of obtaining drive to a pump. An existing roller 10 in the conveyor belt system is supported in bearings 36 on shaft 4. A roller 17 and its shaft 27 are supported in bearings 22. A pump 23 is attached to shaft 27. The roller 17 is adjusted into contact with the roller 10 with adjusting bolts 24 and nuts 25. Brackets 26 support the roller at each end.

Figure 8:
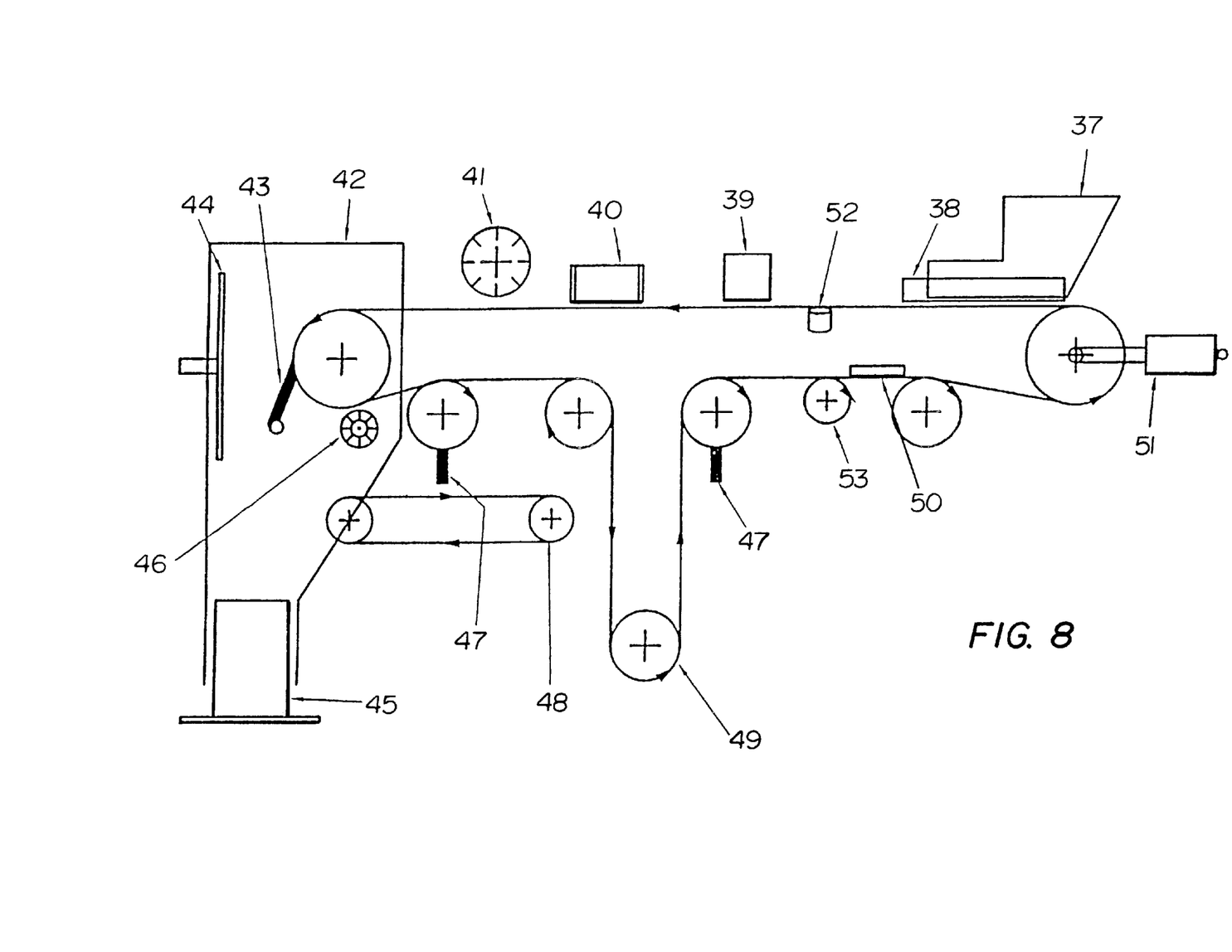
FIG. 8 is a side view of a conveyor belt system showing various devices fitted to a conveyor belt that can be operated using hydraulic power derived from the motion of the belt.

FIG. 8 depicts some of the devices used on an endless conveyor system that may utilise hydraulic power derived from the linear motion of the conveyor belt or rotary motion of the conveyor belt or rotary motion of components fitted to the conveyor system. Loading hopper 37 and loading skirts 38 could be adjusted by hydraulic power derived from the motion of the belt to centralise material being loaded onto the belt. Item 39 depicts a material sampling machine. Item 40 shows a top belt plough that can be adjusted into contact with the belt and also traversed along the length of the conveyor to discharge material at different locations for stockpiling. Again, hydraulics derived from the motion of the conveyor could provide the necessary motive power. Item 41 depicts a rotary magnetic separator suspended above the belt to remove tramp iron, item 46 a rotary cleaner, and item 48 a cleaning conveyor, all of which can be rotated and adjusted by hydraulic power derived from the belt. Referring now to item 43 this depicts a tangential scraper, item 47 a drum/roller scraper and 50 a return end plough, all of which can be automatically adjusted into contact with the belt at a pre-determined pressure and therefore be self adjusting to allow for wear at their cleaning edge. Item 51 shows a tensioning device at the return end, item 44 a band board used to deflect material in the chute and item 45 a diverting plate used to divert material to different locations, all of which can be powered by an hydraulic pump driven from the belt. Item 52 shows a troughing roller, item 42 a chute arrangement, item 49 a gravity tensioning device and item 53 a return idler roller.

All the devices depicted in FIG. 8 can be powered hydraulically and generally only need the power when the belt is in motion. By using the proposed invention no dedicated power source is required.

Figure 9:
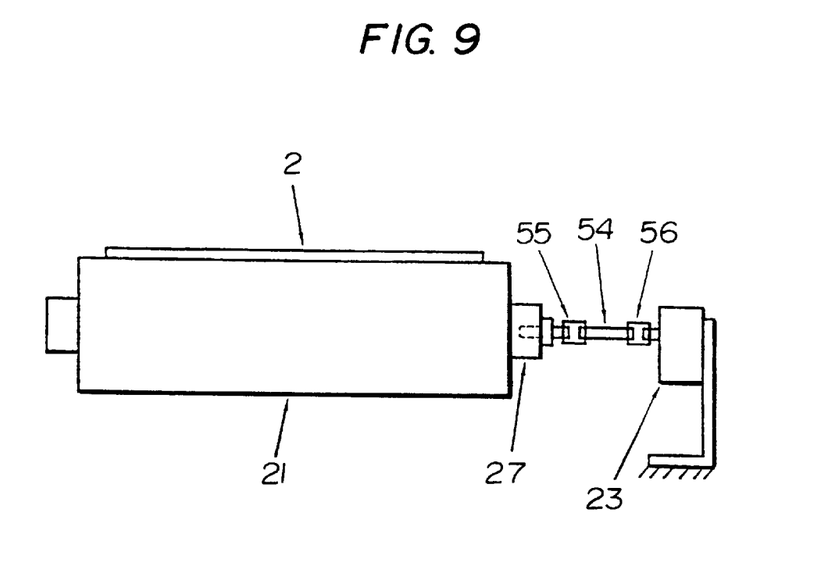
FIG. 9 shows a roller in the conveyor system driving an hydraulic pump utilising a flexible drive shaft to transmit power between the roller and the pump.

FIG. 9 shows a further method of connecting a pump to a roller. Lower return run 2 has a roller 21 adjusted to contact the belt. Connected to the shaft 27 is a flexible drive cable enabling the pump to be positioned in a more convenient location. Flexible cable 54 connects a roller shaft 27 with a coupling 55 and to pump 23 with a coupling 56.

Figure 10:
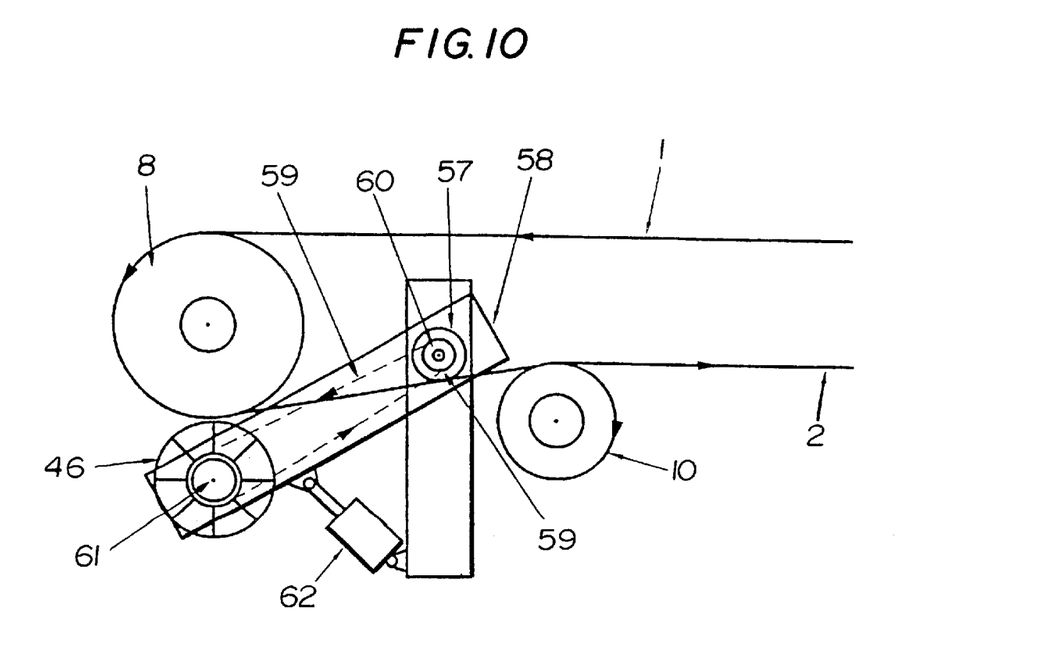
FIG. 10 is a side view of a known type of rotary brush cleaner that is driven by introducing a roller onto the upper surface of the return belt.

FIG. 10 shows a means of obtaining fluid power from a component fitted to a conveyor belt system. A known type of rotary brush cleaner derives its power from a roller engaging the belt surface. A roller 57 is introduced to frictionally engage with the upper surface of the return belt 2. The whole device is supported in cradles 58 at each side of the belt. When the belt is set in motion the roller 57 drives the brush 46 via a toothed belt transmission 59. The cradle 58 pivots around roller shaft 60 which coincides substantially with the drive centre. The attachment of a pump (not shown for clarity) to shaft 60 at either side of the belt or to brush shaft 61 at either side of the belt would allow fluid pressure to be transferred via pipes or hoses to actuators. These actuators 62 would maintain a constant self adjusting force on the cleaner to compensate for brush tip wear. By using an integral hydraulic circuit to this type of cleaner its physical size could be reduced and also enable the brushing pressure to be accurately controlled by the use of a pressure gauge in conjunction with an adjustable relief valve.

Figure 11:
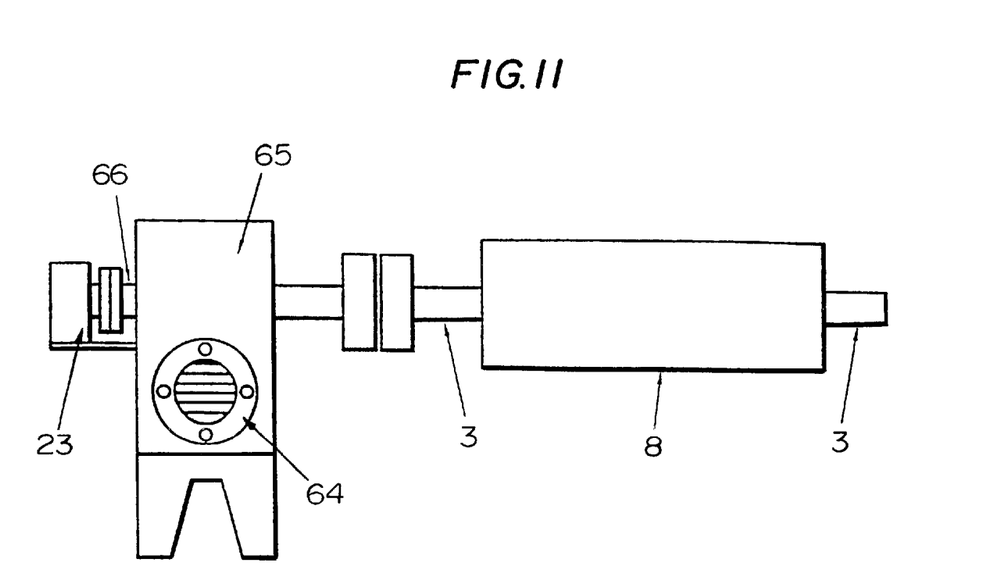
FIG. 11 is an end view of a conveyor system showing a gearbox that transmits power to the driving drum of the conveyor belt, drive to an hydraulic pump being obtained from a shaft on the gearbox.

FIG. 11 depicts another method of deriving hydraulic power from components within the conveyor system. Shown is a simplified end view of a head drum driven by an electric motor via a gearbox. Prime mover 64 drives drum 8 via a gearbox 65. Shaft 3 is connected to gearbox 65. An hydraulic pump 23 can be attached to gearbox 65 by stub shaft 66. Fluid pressure can then be utilised to operate an hydraulic circuit.

Figure 12:
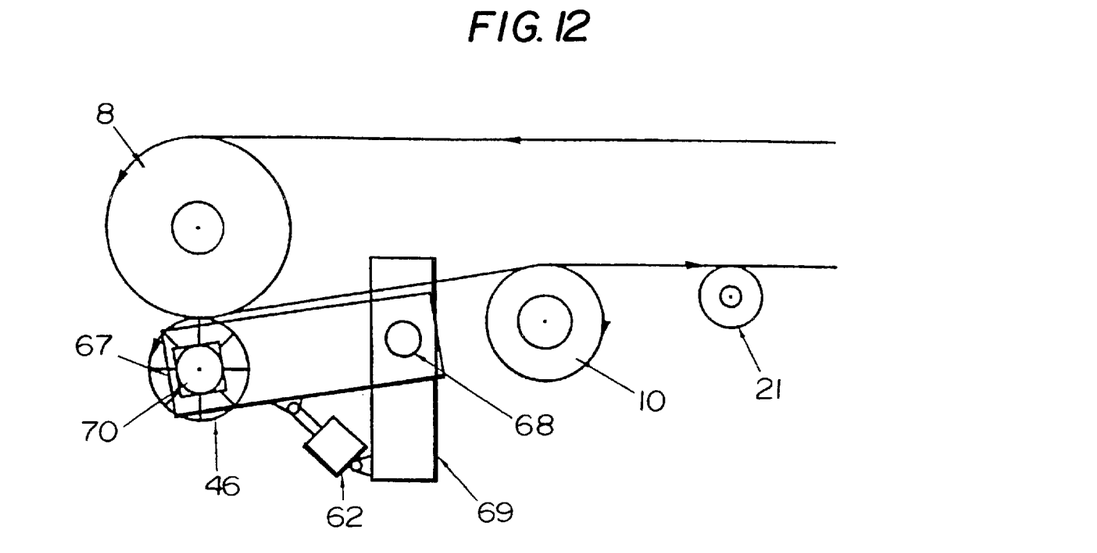
FIG. 12 is a side view of a typical drivehead, with an hydraulically driven rotary brush adjusted into contact with the belt by hydraulic cylinders, hydraulic power to rotate the brush and adjust the cylinders being derived from a pump driven from the motion of the conveyor belt.

FIG. 12 depicts a typical drive head arrangement for an endless conveyor belt. Driven drum 8 moves the belt in the direction shown by the arrows. Rotary cleaner 46 is mounted in a cradle 67 with the cradle being able to pivot around bearing 68. Bracket 69 supports the unit at each side of the conveyor. A roller 21 is introduced to engage frictionally with the belt and a pump is attached as shown in FIG. 5. Pressure by the pump is transferred by hoses or pipes to hydraulic motor 70. This in turn rotates cleaner 46 in the direction shown by the arrow. A tapping taken from the hydraulic circuit allows pressure to cylinders 62 via a pressure reducing valve. By controlling the pressure acting on the cylinders 62 a constant self adjusting force is applied between the cleaner element and the belt surface.

Figure 13:
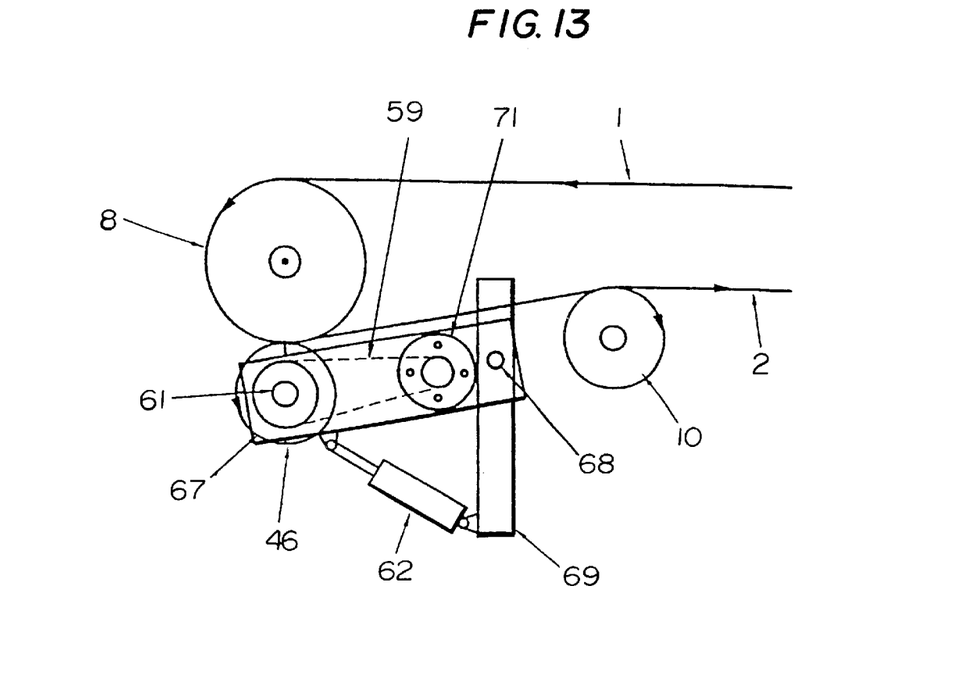
FIG. 13 is again a side view of a conveyor belt drivehead. An electrically or pneumatically driven brush is shown adjusted into contact with the belt using hydraulic cylinders, hydraulic power being obtained from the rotary brush shaft.

FIG. 13 is a similar conveyor arrangement to FIG. 12. A rotary cleaner 46 is supported at each side of the conveyor by cradles 67. The whole unit is supported by brackets 69 at each side of the conveyor. Pivot bearings 68 at each side of the conveyor allow the cradles to pivot with a constant resistance to movement. A pump (not shown for clarity) is attached to the brush shaft 61 at either side of the conveyor. When power is applied to the motor 71 power is transmitted via transmission 59 to the rotary cleaner 46. As the cleaner is rotated the hydraulic pump is in turn rotated and fluid is passed through pipes or hoses to actuators 62.

Figure 14:
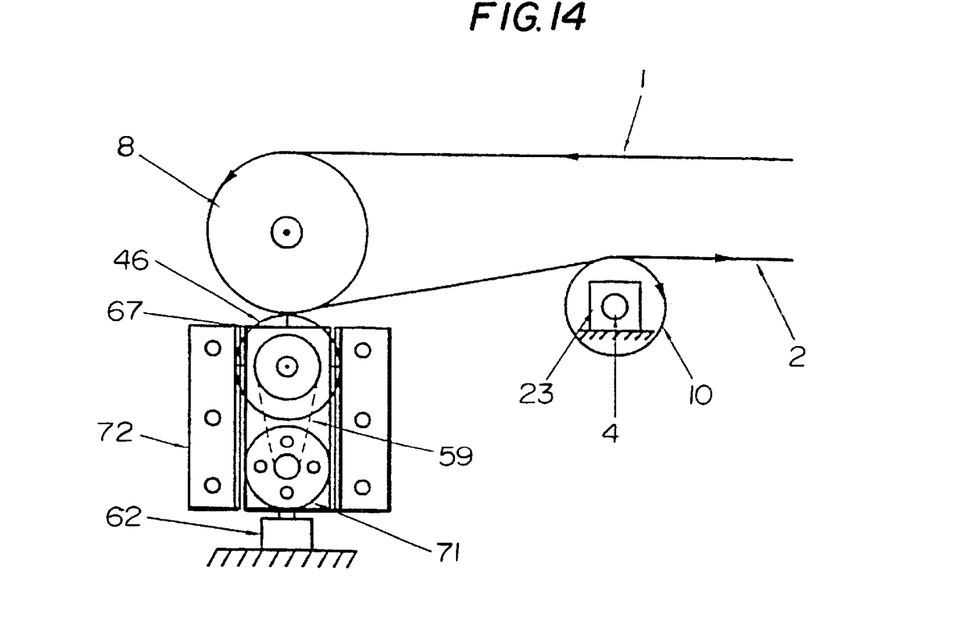
FIG. 14 is a side view of a conveyor drivehead. A electrically driven or pneumatically driven rotary brush is adjusted into contact with the belt surface in a slide arrangement. Hydraulic cylinders maintain the brush in contact with the belt, with hydraulic pressure obtained from a pump driven from the rotary motion of the brush motor.

FIG. 14 is again a simplified sketch of a conveyor drive head. A rotary brush 46 is supported at each side of the conveyor in cradles 67. The whole unit is able to slide in brackets 72. When power is applied to the motor 71 drive is applied to brush 46 via transmission 59. Pump 23 attached to drum shaft 4 pressurises the cylinders 62 maintaining a self adjusting force on the rotary brush.

Figure 15:
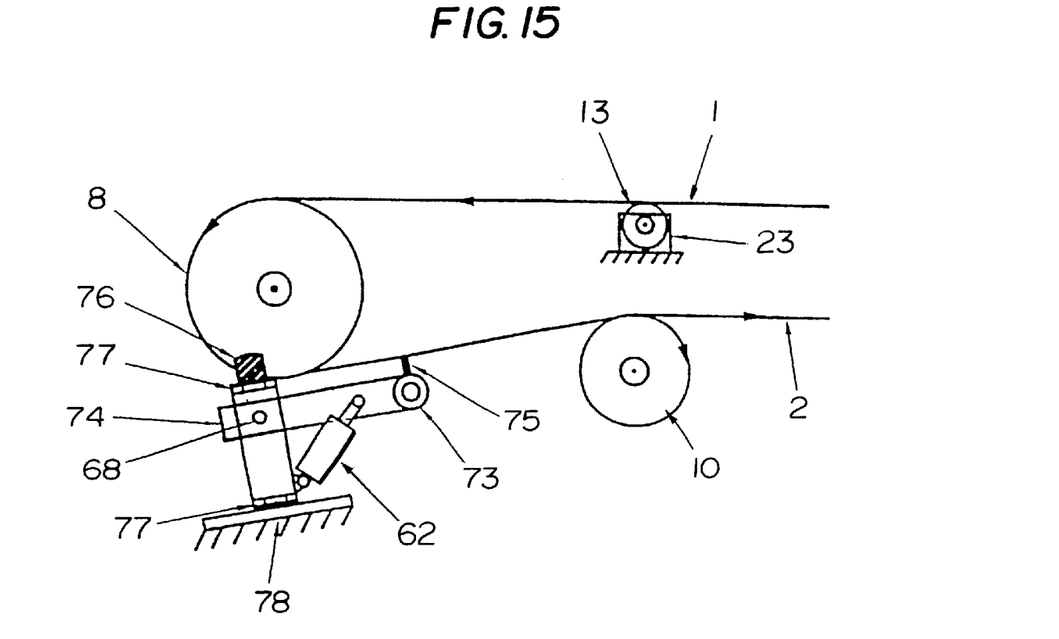
FIG. 15 is again a side view of a conveyor drivehead showing a scraper/cleaner being adjusted into contact with the belt, hydraulic pressure to the actuators being derived from a pump driven by the motion of the conveyor belt.

FIG. 15 shows a scraper arrangement 73 adjusted against the belt surface 2 by cylinders 62. Arm 74 is allowed to rotate around bearings 68 where a constant resistance is present. Pump 23 attached to roller 13 maintains pressure on cylinders 62 until the scraper element 75 is worn out. Initial setting of the scraper is performed by adjusting rod 76 and locked in position by nuts 77. Fixing brackets 78 support the whole unit at each side of the conveyor.

Figure 16:
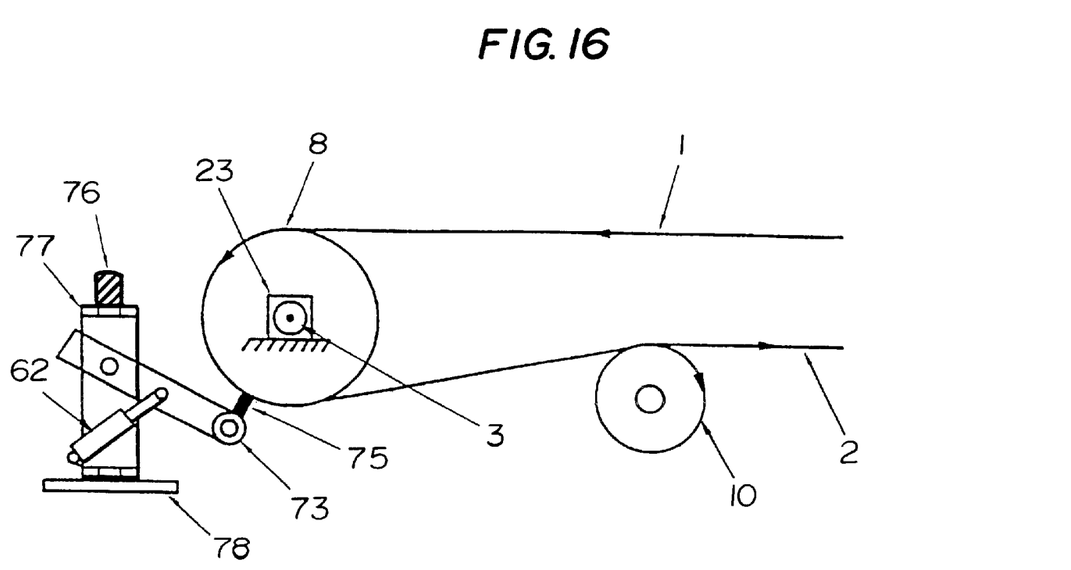
FIG. 16 is a side view of a conveyor drivehead showing a scraper/cleaner being adjusted against the belt surface before the belt departs from the head drum. Again the actuators are pressurised from a pump driven from the motion of the belt.

FIG. 16 is a similar arrangement to FIG. 15 except that the scraper blade 75 is depicted as a primary type scraper. In this case the pump 23 is driven by head drum shaft 3.

Figure 17:
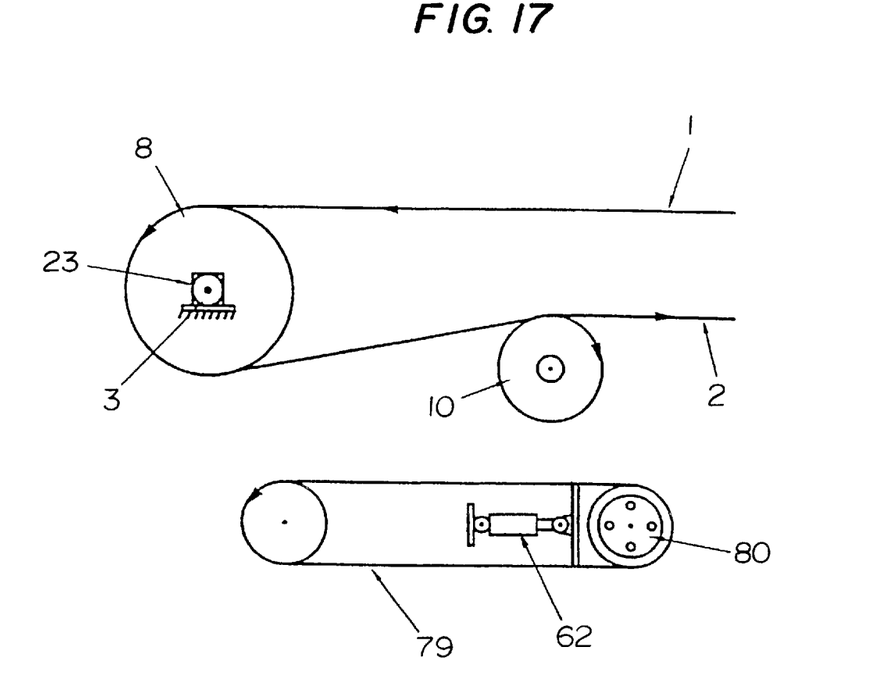
FIG. 17 is a further side view of a conveyor drivehead with a cleaning/fines conveyor underneath. A hydraulic pump is driven from the head drum of the conveyor and applies pressure to cylinders to maintain a constant tension on the cleaning chain.

FIG. 17 shows a conveyor arrangement with a cleaning conveyor underneath to transport scrapings and debris falling from rollers into the main flow of material. A cleaning conveyor 79 is driven by motor 80, cylinders 62 maintain tension on the chains continually whilst the conveyor is running with pressure from pump 23 which is attached to head drum shaft 3. When the belt is stationary pressure is kept in the cylinders by non-return valves.

Figure 18:
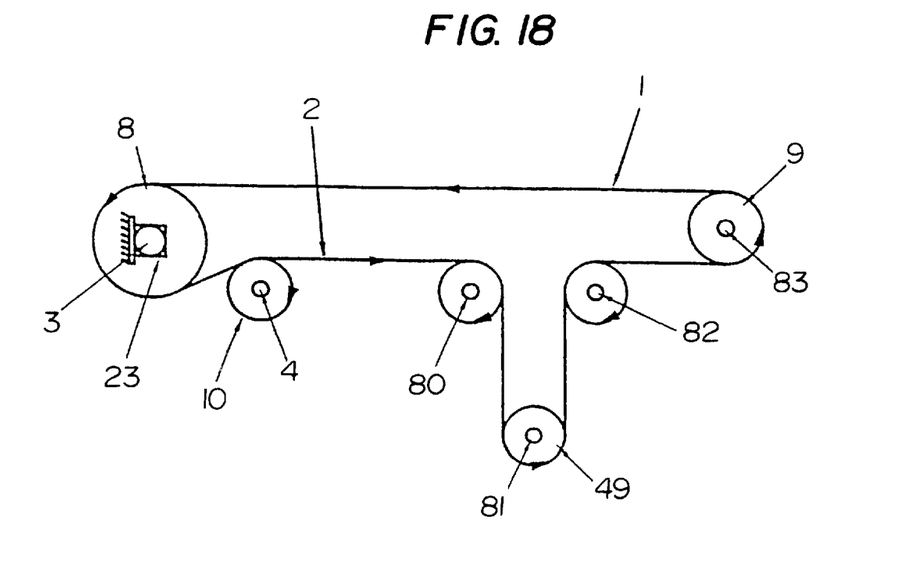
FIG. 18 is a view of a conveyor arrangement depicting rollers in the conveyor system, the supporting bearings of the rollers being lubricated by a greasing system hydraulically operated from a pump which derives its power input from the motion of the conveyor belt or other rotating components in the conveyor belt system.

FIG. 18 shows a typical conveyor belt arrangement in which an endless conveyor belt upper run 1 passes around drum 8, over snub drum 10 and around the gravity tensioning device and finally around return drum 9. All these drums are supported in bearing which need to be greased regularly. By attaching a pump 23 to head drum shaft 3 an automatic lubrication system could be powered to grease bearings supporting shafts 3,4,80,81,82 and 83 along with any other bearings in the conveyor system. This would be particularly useful in remote locations where maintenance is likely to be neglected.

Figure 19:
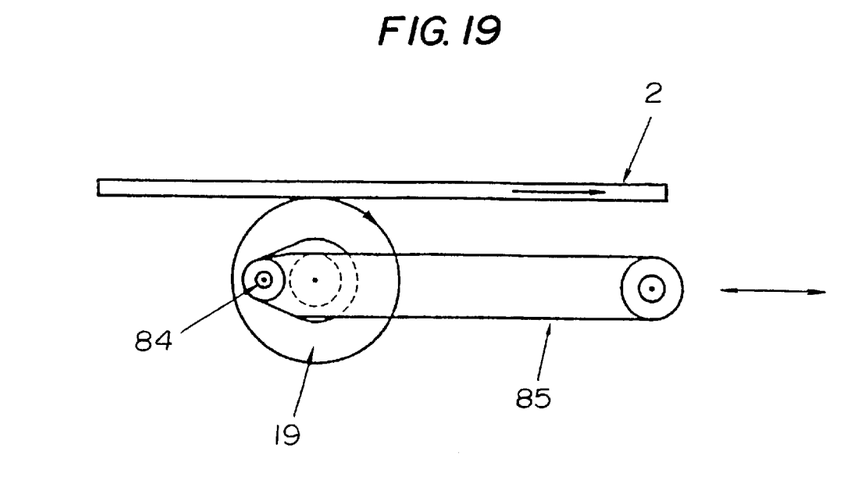
FIG. 19 is a side view of a roller which converts rotary motion into linear motion to drive a device such as a diaphragm pump.

FIG. 19 shows a further embodiment of the device in which a roller is used to drive a linear motion pump. A roller 19 is turned by the linear motion of the belt 2. A crank pin 84 offset from the centre line of the roller produces linear motion to the crank rod 85 which could then be used to power a diaphragm type pump.

Figure 20:
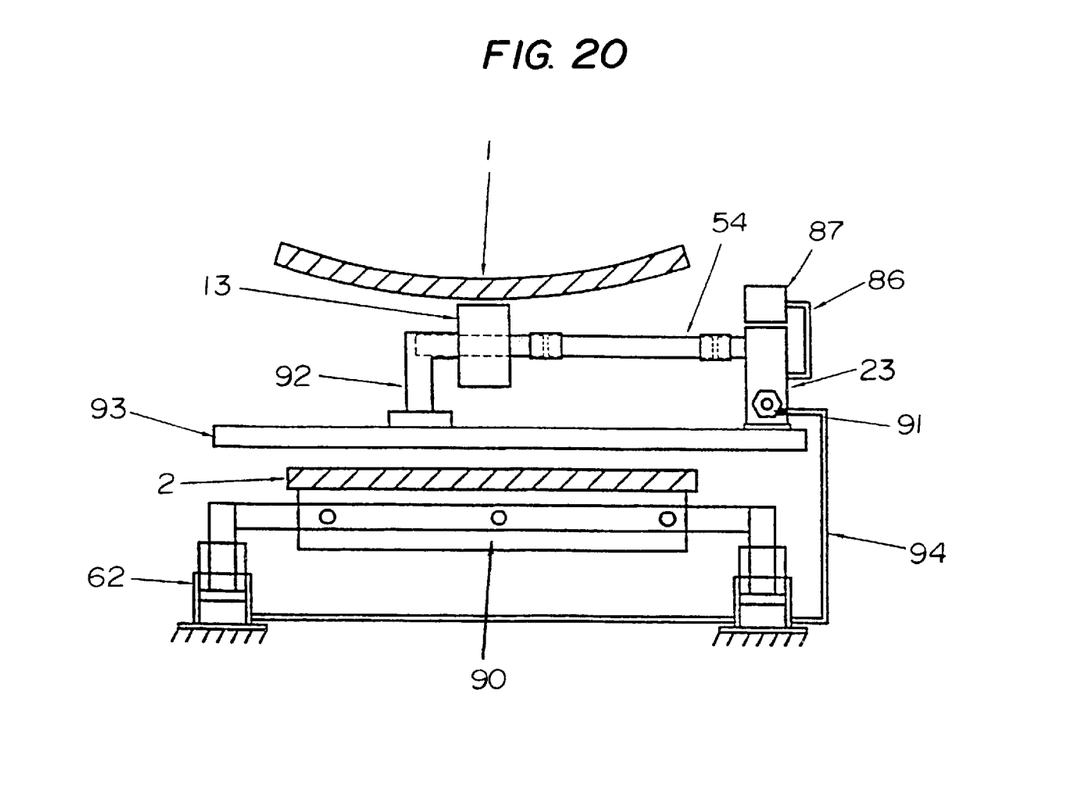
FIG. 20 is an end view of a conveyor system with a roller engaging frictionally with the belt surface only when the belt is loaded with material. This pressurises the actuators on the scraper/cleaner as and when required automatically.

FIG. 20 is a simplified end view of a conveyor system showing positioning of a roller under the troughed section of the belt and how a scraper is maintained at constant pressure only when the upper run is loaded with material.

When upper conveyor run 1 is loaded with material the belt is depressed into frictional engagement with roller 13 which is supported by bearing and bracket 92 and cross member 93. Cross member 93 is fixed to a convenient structure of the conveyor.

Power is then transmitted via a flexible drive cable 54 and rotates pump 23 which is positioned in a convenient location. Hydraulic fluid is drawn through the suction pipe 86 from reservoir 87 and pressure is generated to actuators 62 via pipes 94 which lifts scraper 90 into contact with lower return run 2. A relief valve 91 integral with the pump, controls the pressure applied to the scraper by relieving fluid back into the suction side of the pump. Pressure is maintained in the system until the belt has no material on upper run 1. When the pump is no longer being driven, the weight of the scraper forces oil back to the reservoir, allowing the scraper to relax from the belt surface 2. This method ensures that maximum wear is obtained from the scraper and minimum wear on the belt surface.

What is claimed is:

1. A conveyor belt cleaning arrangement for a conveyor belt system of the type having an endless belt with an upper conveyor run for transporting material and a lower return run, the cleaning arrangement comprising a pivoting arm, a belt cleaner mounted on said pivoting arm, a hydraulic cylinder acting on the arm, and a device which is responsive to the belt or to a rotating component forming part of the conveyor belt system, which device supplies hydraulic pressure to the hydraulic cylinder, only when the belt is in motion, so as to urge said belt cleaner into contact with the belt and wherein the hydraulic pressure is varied by operatively linking the device to the conveyor belt or to the belt cleaner only when the upper conveyor run is laden with material and is operatively disconnected between therefrom when the upper conveyor run is empty.

2. An arrangement according to claim 1, wherein the device is at least one hydraulic pump operably linked to the conveyor belt to generate the hydraulic pressure.

3. An arrangement according to claim 1, wherein the hydraulic pump is connected to the hydraulic cylinder by means of a hydraulic circuit.

4. An arrangement according to claim 3, wherein the hydraulic circuit opens to a reservoir when the hydraulic pressure is varied.

5. An arrangement according to claim 1, which includes two hydraulic pumps operably linked to the conveyor belt to generate the hydraulic pressure.

6. An arrangement according to claim 5, wherein the hydraulic pressure generated by each pump is dependent on the direction of the belt.

7. A cleaning arrangement for use with a conveyor belt which includes at least one belt cleaning device, power take off means which, in response to movement of the belt, pressurizes hydraulic fluid, wherein the flow of the pressurized hydraulic fluid varied depending on the direction of the belt, and actuator means which is operated by the pressurized hydraulic fluid and which is acutable to move the said at least one belt cleaning device into, and out of, cleaning engagement with the belt.

8. A cleaning arrangement according to claim 7, wherein the pressure of the pressurized hydraulic fluid is varied.

9. A cleaning arrangement according to claim 8, wherein the pressure of the pressurized hydraulic fluid is varied depending on the direction of the belt.

10. A method of operating a conveyor belt cleaning device which includes the steps of:

(a) pressurizing hydraulic fluid;

(b) in a manner which is responsive to movement of the conveyor belt, using the pressurized hydraulic fluid to maintain the belt cleaning device, with a substantially constant predetermined force, in cleaning engagement with the belt;

(c) generating the said substantially constant predetermined force when the belt moves in one direction and not generating the said force when the belt in the reverse direction; and (d) varying the flow of the pressurized hydraulic fluid depending on the direction of the movement of the belt.

* * * * *